(12) United States Patent
Lee et al.

(10) Patent No.: US 8,080,978 B2
(45) Date of Patent: Dec. 20, 2011

(54) BATTERY CHARGING SYSTEM AND METHOD

(75) Inventors: Yeong-Sheng Lee, Fremont, CA (US);
Winsheng Cheng, Cupertino, CA (US);
Kuangda Chu, Fremont, CA (US)

(73) Assignee: Via Technologies, Inc., Taipei (TW)

( * ) Notice: Subject to any disclaimer, the term of this patent is extended or adjusted under 35 U.S.C. 154(b) by 443 days.

(21) Appl. No.: 12/403,612

(22) Filed: Mar. 13, 2009

(65) Prior Publication Data

US 2010/0231176 A1    Sep. 16, 2010

(51) Int. Cl.
*H02J 7/00* (2006.01)
*H02J 7/04* (2006.01)

(52) U.S. Cl. .................. 320/128; 320/162; 320/149

(58) Field of Classification Search .......... 320/128, 320/162
See application file for complete search history.

(56) References Cited

U.S. PATENT DOCUMENTS

| | | | | |
|---|---|---|---|---|
| 5,640,078 A | * | 6/1997 | Kou et al. | 320/124 |
| 5,889,387 A | * | 3/1999 | Massie | 320/145 |
| 7,501,794 B2 | * | 3/2009 | Felder et al. | 320/128 |
| 2005/0099159 A1 | * | 5/2005 | Ishida | 320/128 |
| 2008/0258689 A1 | | 10/2008 | Antheunis et al. | |
| 2009/0228221 A1 | * | 9/2009 | Kakiuchi et al. | 702/58 |

* cited by examiner

*Primary Examiner* — M'Baye Diao
(74) *Attorney, Agent, or Firm* — Thomas, Kayden, Horstemeyer & Risley, LLP

(57) ABSTRACT

Methods, devices, and systems for charging a battery in a mobile device are provided. For example, in one embodiment, among others, a battery charging system includes a monitoring circuit configured to monitor a battery and generate a sense current. The battery charging system further includes a comparing circuit configured to compare a reference current and the generated sense current. The comparing circuit is further configured to generate a comparison signal. Also, the battery charging system further includes a control circuit configured to control a level of a charging current applied to the battery based on the comparison signal.

17 Claims, 5 Drawing Sheets

BATTERY CHARGING SYSTEM AND METHOD

TECHNICAL FIELD

The present disclosure is generally related to mobile devices and, more particularly, is related to a system and method of charging a battery of a mobile device.

BACKGROUND

Mobile devices, such as notebook computers, cell phones, mobile Internet devices and portable media players are usually powered by batteries. Mobile devices can also receive power from a connection to an electrical outlet made using an alternating current (AC) adapter. The AC adapter can adjust the voltage output from the electrical outlet to a voltage appropriate for the mobile device. This AC adapter connection can also simultaneously charge the battery while providing full power for the mobile system to operate.

Mobile devices are sometimes configured to charge the batteries using the power received from the AC adapter connection, and charge the battery, often while the mobile device is operating. These mobile devices and the corresponding AC adapters are designed to provide a maximum current to charge the battery while fully powering the mobile device. Some mobile devices are configured to use a non-standard AC adapter, and these mobile devices monitor the power of the non-standard AC adapter and adjust the non-standard AC adapter power. However, using a non-standard AC adapter can be a more expensive approach. In some cases, a standard smaller size AC adapter can be used with the mobile device, but the battery can only be charged when the mobile device is off, which may greatly increase charging time and inconvenience.

SUMMARY

Embodiments of the present disclosure provide a system, device, and method for charging a battery. Briefly described, in one embodiment, a battery charging system, among others, can be implemented as follows. Methods, devices, and systems for charging a battery in a mobile device are provided. For example, in one embodiment, among others, a battery charging system includes a monitoring circuit configured to monitor a battery and generate a sense current. The battery charging system further includes a comparing circuit configured to compare a reference current and the generated sense current. The comparing circuit is further configured to generate a comparison signal. Also, the battery charging system further includes a control circuit configured to control a level of a charging current applied to the battery based on the comparison signal.

Other systems, devices, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments described in the present disclosure provide methods, systems and devices for charging a battery. For example, in one embodiment, among others, a laptop computer includes a battery charging system, which is a circuit that can adjust the charging of the battery based on whether the laptop computer is in a "standby" mode or a "system busy" mode. By adjusting the charging of the battery based on the mode of the laptop computer, the average current usage can be reduced. For example, if the laptop computer is in the "system busy" mode, the battery charging system can reduce the amount of current from an alternating current (AC) adapter that will be used to charge the battery. If the laptop computer is in the "standby" mode, the smart charger system can increase the amount of current used to charge the battery. Because the battery charging system causes the laptop computer to use less current on average, a smaller AC adapter can be used with the laptop computer. The smaller AC adapter is still a standard AC adapter, and since the AC adapter is smaller, the carrying weight and size may be reduced.

Figure 1:
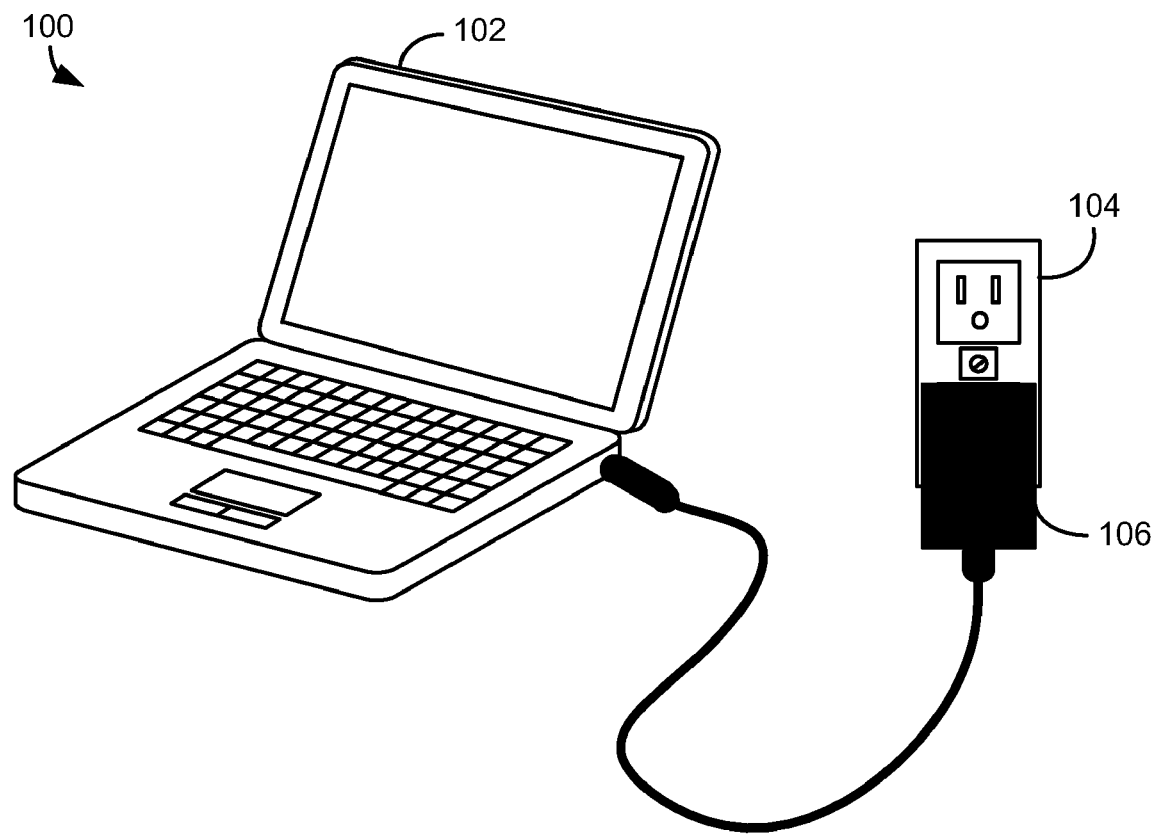
FIG. 1 is a diagram illustrating a mobile device including a battery charging system.

FIG. 1 illustrates a mobile device 102 including a battery charging system. The mobile device 102 is connected to a power source 104 by an AC adapter 106. In the embodiment depicted in FIG. 1, the mobile device 102 is a laptop computer. In other embodiments, the mobile device 102 may be one of a variety of mobile devices, including consumer electronic devices (e.g., multi-media players, music players, portable sound recording devices, digital radio devices), cell phones, smart phones, compatible telecommunication devices, personal digital assistants (PDAs), global positioning system (GPS) navigation systems, digital cameras, digital camcorders, etc.

Figure 2:
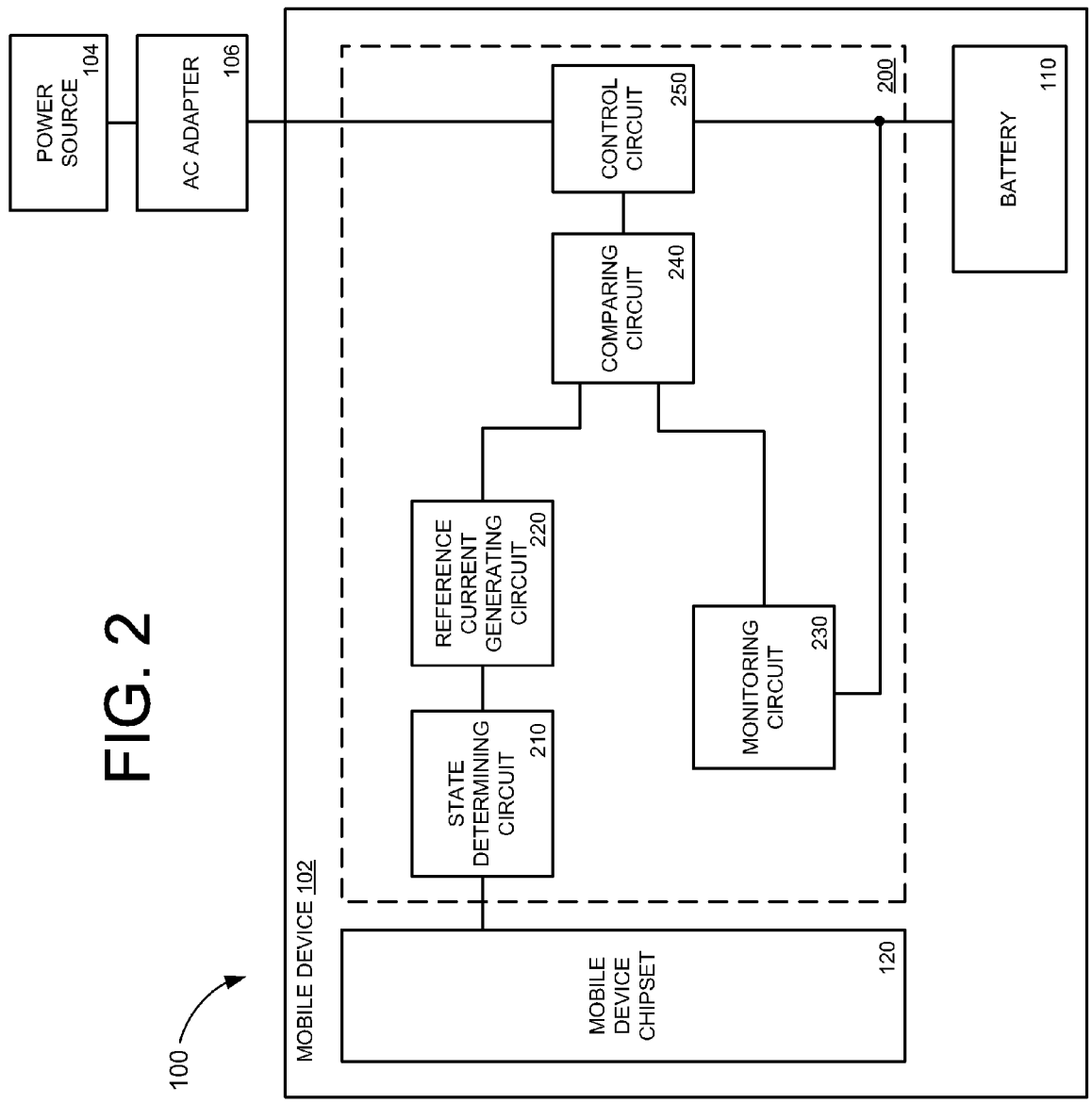
FIG. 2 is a block diagram illustrating an embodiment of a battery charging system.

FIG. 2 is a block diagram illustrating an embodiment of the battery charging system, which is included in the mobile device illustrated in FIG. 1. In FIG. 2, a battery charging system 200 is implemented in a mobile device 102, which includes a mobile device chipset 120 and a battery 110. The battery charging system 200 is coupled to the mobile device chipset 120, the battery 110, and an AC adapter 106, which is coupled to a power source 104. The battery charging system 200 includes a state determining circuit 210, a reference current generating circuit 220, a monitoring circuit 230, a comparing circuit 240, and a control circuit 250.

The state determining circuit 210 is configured to receive a first mobile device status signal SUSB and a second mobile device status signal SUSC from a mobile device chipset 120. The state determining circuit 210 determines the state of the mobile device 102 based on the first mobile device status signal SUSB and the second mobile device status signal SUSC, and the state determining circuit 210 generates a status signal $I_{STATUS}$ based on the determination.

The reference current generating circuit 220 is coupled to the state determining circuit 210. The reference current generating circuit 220 receives the status signal $I_{STATUS}$ generated by the state determining circuit 210 and generates a reference current $I_{REF}$ based on the received status signal $I_{STATUS}$.

The monitoring circuit 230 is configured to monitor the battery 110 and the control circuit 250. The monitoring circuit 230 generates a sense current $I_{SENSE}$ based on the monitoring of the battery 110 and the control circuit 250.

The comparing circuit 240 is configured to receive the reference current $I_{REF}$ from the reference current generating circuit 220 and the sense current $I_{SENSE}$ from the monitoring circuit 230. The comparing circuit 240 is further configured to compare the received reference current $I_{REF}$ and the received sense current $I_{SENSE}$ and generate a comparison signal $I_{COMPARISON}$ based on the comparison.

The control circuit 250 is coupled to the comparing circuit 240, the battery 110, and the AC adapter 106, which is coupled to a power source 104. The control circuit 250 receives the comparison signal $I_{COMPARISON}$ from the comparing circuit 240 as an input. Also, the control circuit 250 is configured to control the application of a charging current $I_{CHARGE}$ to the battery 110.

Figure 3:
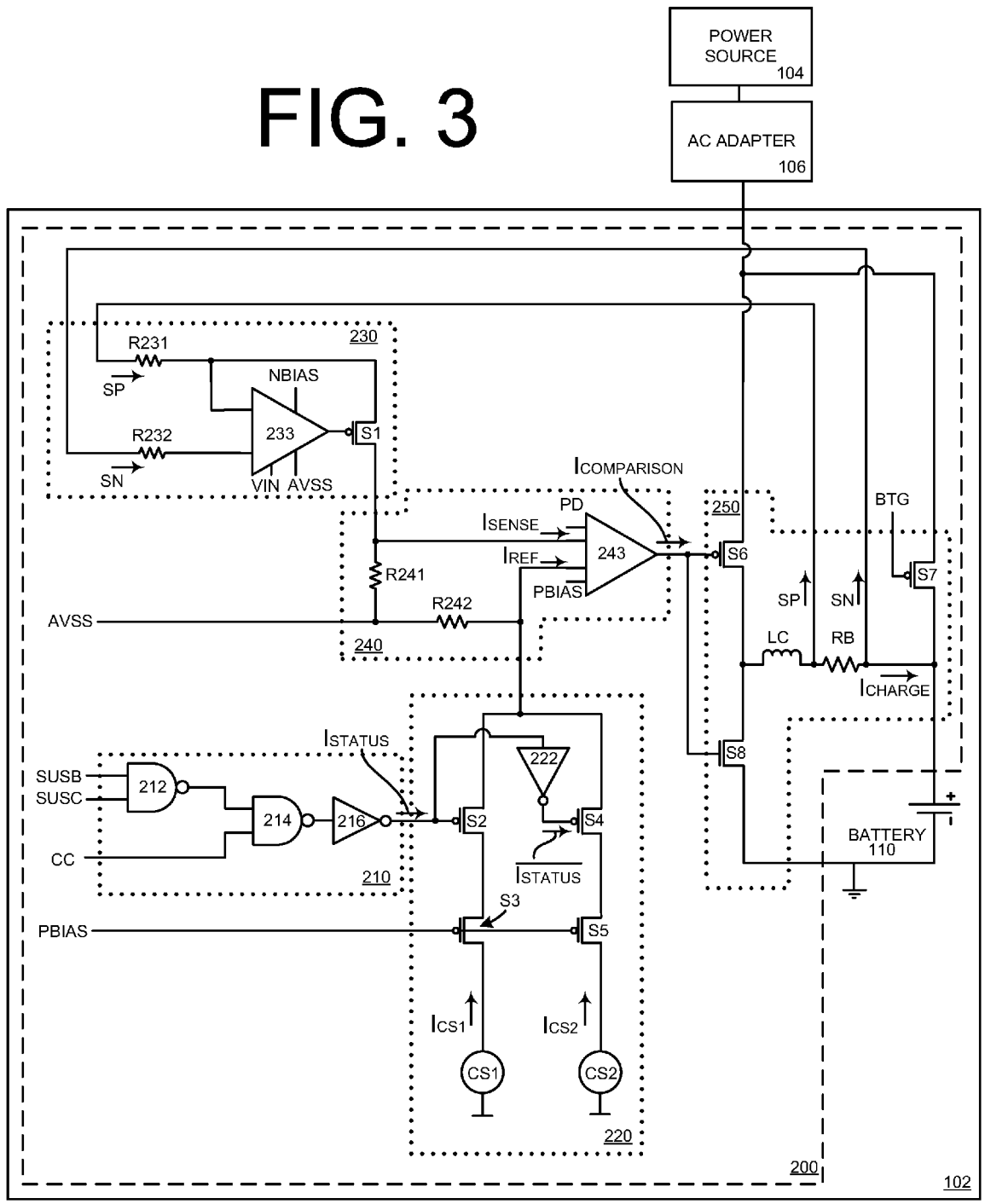
FIG. 3 is a circuit diagram illustrating a first example of the embodiment of the battery charging system depicted in the block diagram of FIG. 2.

FIG. 3 is a circuit diagram illustrating a first example of the embodiment of the battery charging system 200 depicted in the block diagram of FIG. 2. In FIG. 3, the state determining circuit 210 is configured to receive a first mobile device status signal SUSB and a second mobile device status signal SUSC from a mobile device chipset 120. The state determining circuit 210 includes a first NAND gate 212, a second NAND gate 214, and an inverter 216. The first NAND gate 212 is configured to receive the first mobile device status signal SUSB and the second mobile device status signal SUSC. The second NAND gate 214 is configured to receive the output of the first NAND gate 212 and a current control signal CC. The current control signal CC includes a constant logical value. The output of the second NAND gate 214 is received by the inverter 216. The output of the inverter 216 is the status signal $I_{STATUS}$. Hence, the state determining circuit 210 is configured to determine the state of the mobile device 102 based on the first mobile device status signal SUSB, the second mobile device status signal SUSC, and/or the current control signal CC from the mobile device chipset 120, and the state determining circuit 210 outputs the status signal $I_{STATUS}$.

The reference current generating circuit 220 is configured to receive the status signal $I_{STATUS}$ generated by the state determining circuit 210 and generate a reference current $I_{REF}$. The reference current generating circuit 220 includes two pairs of switching elements S2, S3 and S4, S5. In the embodiment illustrated in FIG. 3, the switching elements S2, S3, S4, S5 are a metal-oxide-semiconductor field effect transistors (MOSFETs) and, in particular, PFETs. Specifically, the first pair of switching elements S2 and S3 are connected in series. Switching element S3 is coupled to a first current source CS1, and the switching element S2 is coupled to the comparing circuit 240. The first current source CS1 is configured to generate a first source current $I_{CS1}$. In some embodiments, the first current source CS1 is a 10 µA current source and the first source current $I_{CS1}$ is a 10 µA current. The second pair of switching elements S4 and S5 are also connected in series, and the switching element S5 is coupled to a second current source CS2, and the switching element S4 is coupled to the comparing circuit 240. The second current source CS2 is configured to generate a second source current $I_{CS2}$. In some embodiments, the second current source CS2 is a 20 µA current source and the second source current $I_{CS2}$ is a 20 µA current. Switching elements S3 and S5 are each controlled by a PBIAS signal. Switching element S2 is controlled by the status signal $I_{STATUS}$, which is received from the state determining circuit 210. The status signal $I_{STATUS}$ is inverted by an inverter 222, and the inverted status signal $I_{STATUS}$ bar controls the switching element S4.

The reference current generating circuit 220 is configured to select whether to output the first source current $I_{CS1}$ or the second source current $I_{CS2}$ as the generated reference current $I_{REF}$ according to the status signal $I_{STATUS}$ received from the state determining circuit 210. In other words, the reference current generating circuit 220 is configured to select whether the generated reference current $I_{REF}$ will include a high level or low level of current depending on the state of the mobile device 102 determined by the state determining circuit 210. The high level (e.g., the amount of the second source current $I_{CS2}$) is high relative to the low level (e.g., the first source current $I_{CS1}$), and likewise, the low level (e.g., the first source current $I_{CS1}$) is low relative to the high level (e.g., the second source current $I_{CS2}$).

The monitoring circuit 230 monitors the control circuit 250 and the battery 110, and the monitoring circuit 230 receives a first signal SN and an second signal SP from the control circuit 250, which is coupled to the battery 110. The monitoring circuit 230 includes two resistors R231 and R232 coupled to an operational amplifier 233. The second signal SP is applied to resistor R231 and the first signal SN is applied to resistor R232, and the resistors R231, R232 are coupled to the operational amplifier 233. Operational amplifier 233 receives an NBIAS, a VIN bias as well as an AVSS bias. The output of the operational amplifier 233 controls switching element S1. In the embodiment illustrated in FIG. 3, the switching element S1 is a MOSFET and, in particular, a PFET. One of the diffusions of the switching element S1 is coupled to resistor R231, and the other diffusion of the switching element S1 is the output of the monitoring circuit 230. Specifically, the output of the monitoring circuit 230 is the sense current $I_{SENSE}$.

The comparing circuit 240 is configured to receive the sense current $I_{SENSE}$ from the monitoring circuit 230 and the reference current $I_{REF}$ from the reference current generating circuit 220. The comparing circuit 240 includes a comparator 243 and two resistors R241 and R242, which are coupled together and coupled to a bias AVSS. The output of the monitoring circuit 230, which is the sense current $I_{SENSE}$, is coupled to a first input of the comparator 243. Also, the output of the reference current generating circuit 220, which is the reference current $I_{REF}$, is coupled to a second input of comparator 243. The comparator 243 compares the sense current $I_{SENSE}$ and the reference current $I_{REF}$ and outputs a comparison signal $I_{COMPARISON}$ based on the comparison.

The control circuit 250 is configured to control the charging current $I_{CHARGE}$ applied to the battery 110 based on the comparison signal $I_{COMPARISON}$ received from the comparing circuit 240. The control circuit 250 includes switching elements S6 and S8 connected in series. The switching element S8 is MOSFET and, in particular, a NFET, which is controlled by the comparison signal $I_{COMPARISON}$ from the comparing circuit 240. The switching element S6 is a MOSFET and, in particular, a PFET, which is controlled by comparison signal $I_{COMPARISON}$ from the comparing circuit 240. Hence, depending upon the comparison of the sense current $I_{SENSE}$ and the reference current $I_{REF}$, the switching element S6 of the control circuit 250 is configured to control whether the AC adapter 106 is coupled to the battery 110 and, thus, also controls the charging current $I_{CHARGE}$ applied to the battery 110. Specifically, the control circuit 250 is configured to control whether a high level of charging current $I_{CHARGE}$ or a low level of charging current $I_{CHARGE}$ is applied to the battery 110. The high level (e.g., 4 A) of charging current $I_{CHARGE}$ is high relative to a low level (e.g., 2 A) of charging current $I_{CHARGE}$, and the low level (e.g., 2 A) of charging current $I_{CHARGE}$ is low relative to a high level (e.g., 4 A) of charging current $I_{CHARGE}$.

The control circuit 250 also includes an inductor LC and a resistor RB connected in series. The inductor LC is coupled to the switching elements S6 and S8 as shown in FIG. 3. The resistor RB is coupled to the anode of the battery 110. The monitoring circuit 230, configured to generate the sense current $I_{SENSE}$, is configured to receive a first signal SN and a second signal SP from the control circuit 250. The first signal SN is applied to the resistor R232 of the monitoring circuit 230, and the resistor R232 is coupled to the connection between the resistor RB of the control circuit 250 and the anode of the battery 110. The second signal SP is applied to resistor R231 of the monitoring circuit 230, and the resistor R231 is coupled to the connection between the inductor LC and the resistor RB in the control circuit 250. The resistor RB acts as a voltage divider such that there is a voltage division between the first signal SN and the second signal SP, which are applied to the operational amplifier 233 of the monitoring circuit 230. In this way, the monitoring circuit 230 is configured to monitor the battery voltage of the battery 110.

The control circuit 250 also includes a switching element S7 that controls the battery 110 to supply power to the mobile device 102, which is illustrated in the nonlimiting example depicted in FIG. 2. The switching element S7 is coupled to the AC adapter 106 and connected in series to the anode of the battery 110. The switching element S7 is a MOSFET and, in particular, a PFET, which is controlled by a BTG signal. The BTG signal indicates whether the AC adapter 106 is coupled to the mobile device 102 and, thus, whether the mobile device 102 is to be powered by the battery 110.

In some embodiments, each of the switching elements S1, S2, S3, S4, S5, S6, S7 and S8 may comprise a solid state switch such as a transistor, etc. Specifically, MOSFETs or other types of transistors may be employed. Alternatively, other types of switching elements may be employed such as switches or other elements.

Figure 4:
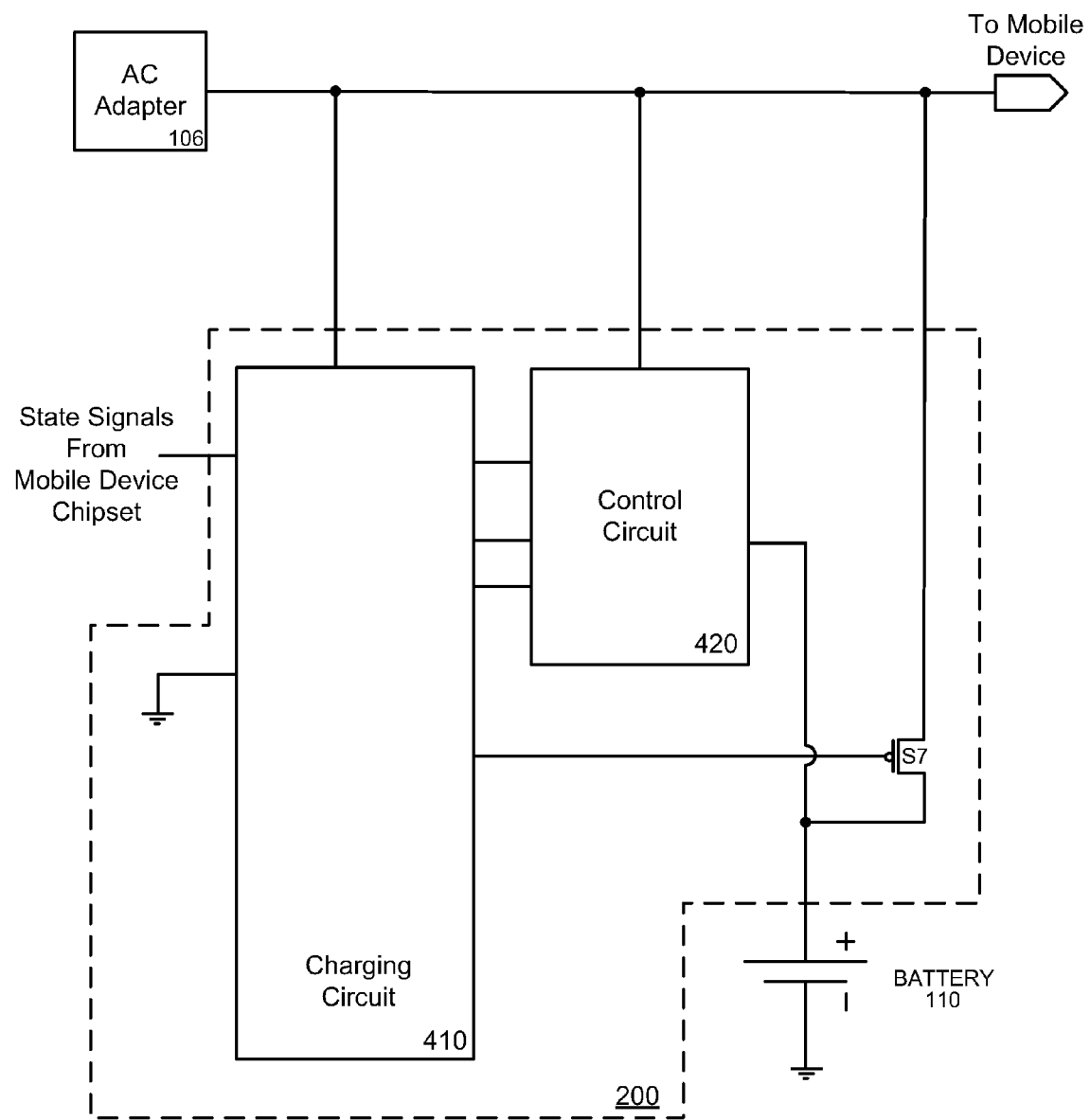
FIG. 4 is a circuit diagram illustrating a second example of the embodiment of the battery charging system depicted in the block diagram of FIG. 2.

FIG. 4 is a circuit diagram illustrating a second example of the embodiment of the battery charging system 200 illustrated in FIG. 2. In the example illustrated in FIG. 4, the state determining circuit 210, the reference current generating circuit 220, the monitoring circuit 230, and the comparing circuit 240 are implemented in a charging circuit 410. The charging circuit 410 receives state signals from the mobile device chipset 120. Specifically, the charging circuit 410 receives the first mobile device state signal SUSB, the second mobile device state signal SUSC, and the current control signal CC. The charging circuit 410 is coupled to a control circuit 420, which has a configuration similar to the control circuit 250 of FIG. 3. The control circuit 420 is coupled to the battery 110, and the battery 110 is also coupled to switching element S7. The switching element S7 is also coupled to a connection between the AC adapter 106 and the mobile device. The switching element S7, which corresponds to the switching element S7 in FIG. 3, is controlled by the charging circuit 410.

Figure 5:
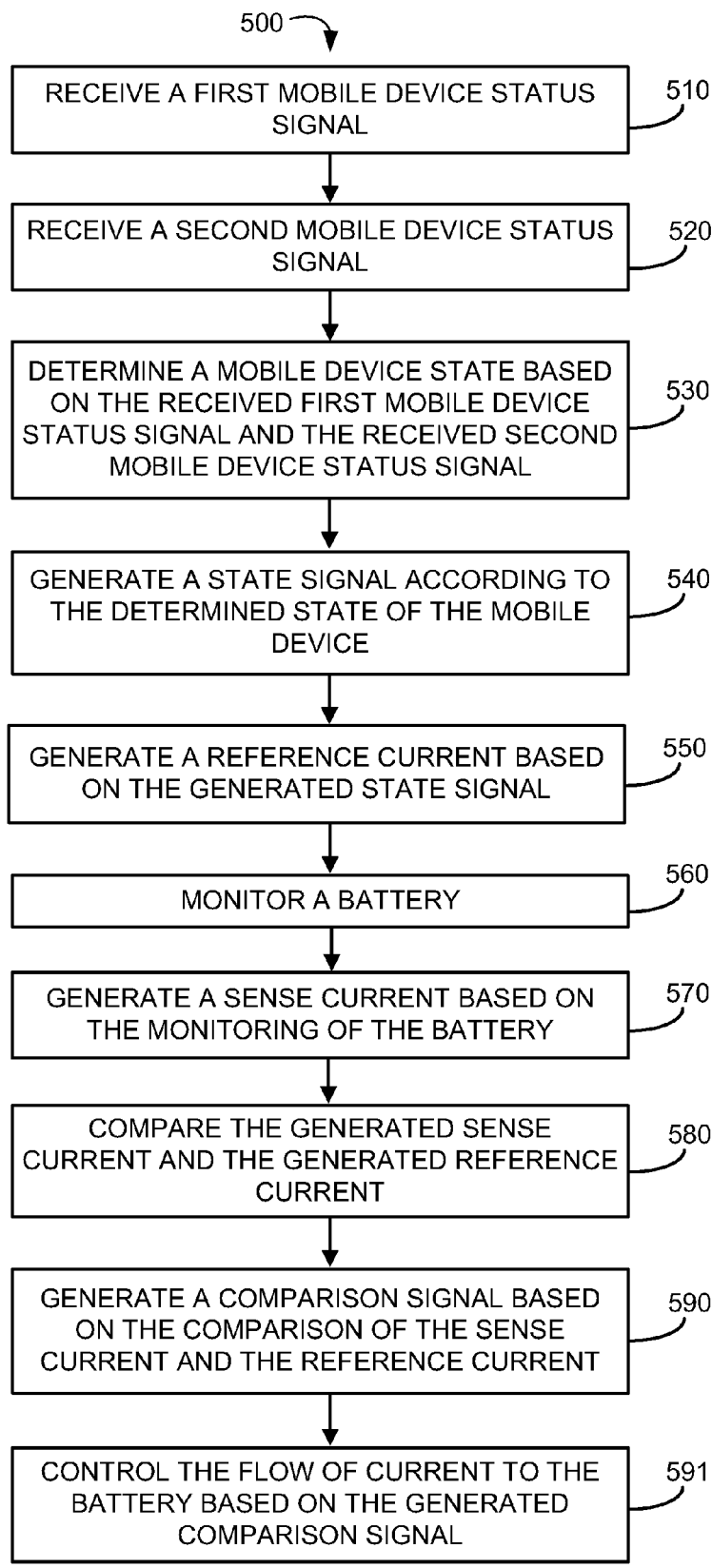
FIG. 5 is a flow chart illustrating an embodiment of a method of charging a battery.

FIG. 5 illustrates an embodiment of method of charging a battery. The method 500 illustrated in FIG. 5 includes blocks 510, 520, 530, 540, 550, 560, 570, 580, 590, and 591. In block 510, a first mobile device status signal is received, and in block 520, a second mobile device status signal is received. For example, referring to FIGS. 2 and 3, a first mobile device status signal SUSB and a second mobile device status signal SUSC are received by the state determining circuit 210 in the battery charging system 200. As discussed above regarding FIGS. 2 and 3, the first mobile device status signal SUSB and the second mobile device status signal SUSC are received by the state determining circuit 210 in the battery charging system 200 from the mobile device chipset 120 in the mobile device 102. Specifically, a first NAND gate 212 in the state determining circuit 210 receives the first mobile device status signal SUSB and the second mobile device status signal SUSC. In some embodiments, a current control signal CC is also received by the state determining circuit 210, and a second NAND gate 214 receives the current control signal CC.

In block 530, a mobile device state is determined based on the received first mobile device status signal and the received second mobile device status signal. For example, referring to FIG. 3, the state determining circuit 210 determines the state of the mobile device 102 using the first mobile device status signal SUSB and the second mobile device status signal SUSC, which are received at the first NAND gate 212. Further, the output of the first NAND gate 212 is received by the second NAND gate 214, which also receives the current control signal CC. The output of the second NAND gate 214 is received by an inverter 216.

As a first example, when the first mobile device status signal SUSB has a logical value of "1" and the second mobile device status signal SUSC has a logical value of "1," the output of first NAND gate 212 has a logical value of "0." The second NAND gate 214 receives the logical value of "0" from the first NAND gate 212 and receives the control current signal CC, which in this example has a logical value of "1." Accordingly, the second NAND gate 214 outputs a logical value of "1," which is inverted by inverter 216 to be a logical value of "0."

As a second example, when the first mobile device status signal SUSB has a logical value of "0" and the second mobile device status signal SUSC has a logical value of "1," the output of first NAND gate 212 has a logical value of "1." The second NAND gate 214 receives the logical value of "1" from the first NAND gate 212 and receives the control current signal CC, which in this example has a logical value of "1." Accordingly, the second NAND gate 214 outputs a logical value of "0," which is inverted by the inverter 216 to include a logical value of "1."

In block 540, a state signal is generated according to the determined state of the mobile device. For example, referring to FIG. 3, based on the state of the mobile device 102 determined using the first NAND gate 212, the second NAND gate 214, and the inverter 216 in block 530, the state determining circuit 210 generates the status signal $I_{STATUS}$, which is the output of inverter 216. Hence, in the first example discussed above, the inverter 216 outputs a logical value of "0" as the status signal $I_{STATUS}$, and in the second example discussed above, the inverter 216 outputs a logical value of "1" as the status signal $I_{STATUS}$.

In block 550, a reference current is generated based on the generated state signal. For example, referring to FIG. 3, the reference current generating circuit 220 generates a reference current $I_{REF}$ based on the status signal $I_{STATUS}$ received from the state determining circuit 210. The reference current generating circuit 220 selects whether the generated reference current $I_{REF}$ will include a high level or low level of current depending on the state of the mobile device 102 determined by the state determining circuit 210. The high level (e.g., the second source current $I_{CS2}$) of the reference current $I_{REF}$ is high relative to the low level (e.g., the first source current $I_{CS1}$) of the reference current $I_{REF}$, and likewise, the low level (e.g., the first source current $I_{CS1}$) of the reference current $I_{REF}$ is low relative to the high level (e.g., the second source current $I_{CS2}$) of the reference current $I_{REF}$. In other words, the reference current generating circuit 220 selects whether to output the first source current $I_{CS1}$ or the second source current $I_{CS2}$ as the generated reference current $I_{REF}$ according to the status signal $I_{STATUS}$ received from the state determining circuit 210.

Continuing the first example discussed above in blocks 530 and 540, when the status signal $I_{STATUS}$ is equal to a logical value of "0," the switching element S2, which in this embodiment is a PFET, conducts current and couples the first current source CS1 to the comparing circuit 240, and thus, the reference current $I_{REF}$ generated by the reference current generating circuit 220 includes the first source current $I_{CS1}$. Further, when the status signal $I_{STATUS}$ is equal to a logical value of "0," the inverter 222 inverts the status signal $I_{STATUS}$ and applies a logical value of "1" as the inverted status signal $I_{STATUS}$ bar to the switching element S4. Since switching element S4 is a PFET, the second current source CS2 is decoupled from the comparing circuit 240. In other words, the reference current $I_{REF}$ will be set at the low level (e.g., the first source current $I_{CS1}$) of the reference current $I_{REF}$ when the status signal $I_{STATUS}$ is equal to a logical value of "0." Thus, the reference current $I_{REF}$ is generated by the reference current generating circuit 220 based on the generated status signal $I_{STATUS}$.

Continuing the second example discussed above in blocks 530 and 540, when the status signal $I_{STATUS}$ is equal to a logical value of "1" and because the switching element S2 is a PFET, the first current source CS1 is decoupled from the comparing circuit 240 because the PFET will not conduct current. Further, when the status signal $I_{STATUS}$ has a logical value of "1," the inverter 222 inverts the status signal $I_{STATUS}$ and applies a logical value of "0" as the inverted status signal $I_{STATUS}$ bar to the switching element S4. Because the switching element S4 is a PFET and conducts current responsive to the application of a logical value of "0" to its gate, the second current source CS2 is coupled to the comparing circuit 240. In other words, the reference current $I_{REF}$ will be set at the high level (e.g., the second source current $I_{CS2}$) of the reference current $I_{REF}$ when the status signal $I_{STATUS}$ is equal to a logical value of "1." Thus, the reference current $I_{REF}$ is generated by the reference current generating circuit 220 based on the generated status signal $I_{STATUS}$.

In block 560, a battery is monitored. For example, referring to FIG. 3, the battery 110, which is coupled to the battery charging system 200, is monitored by the monitoring circuit 230. As discussed above, the operational amplifier 233 in the monitoring circuit 230 receives the first signal SN and the second signal SP from the control circuit 250 coupled to the battery 110.

In block 570, a sense current is generated based on the monitoring of the battery in block 560. For example, referring to FIG. 3, the output of the operational amplifier 233 in the monitoring circuit 230 controls the switching element S1. As discussed above, one of the diffusions of the switching element S1 is coupled to the resistor R231, and the other diffusion of the switching element S1 is the output of the monitoring circuit 230. Specifically, the output of the monitoring circuit 230 is the sense current $I_{SENSE}$, which is generated based on the received first signal SN and the received second signal SP. The output of the monitoring circuit 230, which is the sense current $I_{SENSE}$, is applied to the comparing circuit 240.

In block 580, the generated sense current and the generated reference current are compared. For example, the sense current $I_{SENSE}$ generated by the monitoring circuit 230 and the reference current $I_{REF}$ generated by the reference current generating circuit 220 are compared using a comparator 243 in the comparing circuit 240.

In block 590, a comparison signal is generated based on the comparison of the generated sense current and the generated reference current. For example, referring to FIG. 3, a comparison signal $I_{COMPARISON}$ is generated by the comparator 243 based on a comparison in block 580.

In block 591, the flow of current to the battery is controlled based on the generated comparison signal. For example, referring to FIG. 3, the comparison signal $I_{COMPARISON}$, which is the output of the comparator 243 of the comparing circuit 240, is applied to the control circuit 250. As discussed above, the control circuit 250 includes switching elements S6 and S8 connected in series. In the embodiment illustrated in FIG. 3, switching element S6 is a PFET, and switching element S8 is a NFET. Both of the switching elements S6, S8 are controlled by the comparison signal $I_{COMPARISON}$. Hence, depending on the comparison signal $I_{COMPARISON}$, the charging current $I_{CHARGE}$ applied to the battery 110 is a high level or a low level.

For example, if the comparison signal $I_{COMPARISON}$ is equal to a logical value of "0," the switching element S6, which is a PFET, conducts current and couples the AC adapter 106 to the battery 110. Further, the switching element S8, which is an NFET, is also controlled by the comparison signal $I_{COMPARISON}$, and is decoupled from ground. Hence, the charging current $I_{CHARGE}$ applied to the battery 110 includes a high level of current. The high level (e.g., 4 A) of charging current $I_{CHARGE}$ is high relative to a low level (e.g., 2 A) of charging current $I_{CHARGE}$.

For example, if the comparison signal $I_{COMPARISON}$ is equal to a logical value of "1," the switching element S6, which is a PFET, does not conduct current and decouples the AC adapter 106 from the battery 110. Further, the switching element S8, which is an NFET, is also controlled by the comparison signal $I_{COMPARISON}$, and couples the inductor LC to ground. Hence, the charging current $I_{CHARGE}$ applied to the battery 110 includes a low level of current. The low level (e.g., 2 A) of charging current $I_{CHARGE}$ is low relative to a high level (e.g., 4 A) of charging current $I_{CHARGE}$.

Table 1 illustrates the logical values of various signals and current levels depending on the states of the mobile device 102, which are discussed above.

TABLE 1

Signal Values and Current Levels Based on the Mobile Device State

| DESCRIPTION OF STATE | STATE | CC | SUSB | SUSC | $I_{STATUS}$ | $I_{REF}$ | $I_{CHARGE}$ |
|---|---|---|---|---|---|---|---|
| SYSTEM BUSY | S0 | 1 | 1 | 1 | 0 | LOW | LOW |
| STANDBY MODE | S1 | 1 | 1 | 1 | 0 | LOW | LOW |
| STANDBY MODE | S3 | 1 | 0 | 1 | 1 | HIGH | HIGH |
| STANDBY MODE | S4 | 1 | 0 | 1 | 1 | HIGH | HIGH |
| POWER OFF | S5 | 1 | 0 | 0 | 1 | HIGH | HIGH |

The flow chart of FIG. 5 shows the architecture, functionality, and operation of a possible implementation of the battery charging system. In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A battery charging system comprising:
    a monitoring circuit configured to monitor a battery and generate a sense current;
    a comparing circuit configured to compare a reference current and the generated sense current, wherein the comparing circuit is further configured to generate a comparison signal;
    a control circuit configured to control a level of a charging current applied to the battery based on the comparison signal; and
    a state determining circuit configured to receive a first mobile device status signal and a second mobile device status signal from a mobile device chipset, wherein the state determining circuit is further configured to generate a status signal.

2. The battery charging system of claim 1, further comprising:
    a state determining circuit configured to receive a current control signal, wherein the state determining circuit is further configured to generate a status signal.

3. The battery charging system of claim 1, further comprising:
    a reference current generating circuit configured to generate the reference current based on the generated status signal.

4. The battery charging system of claim 3, wherein the reference current generating circuit includes two pairs of switching elements.

5. The battery charging system of claim 1, wherein the monitoring circuit is configured to receive a first battery monitoring signal and a second battery monitoring signal from the control circuit.

6. The battery charging system of 1, wherein the battery charging system is embodied in an integrated circuit.

7. A method for adaptively charging a battery of a mobile device, the method comprising:
    receiving a first mobile device status signal;
    adjusting a level of a charging current of an alternating current (AC) adapter applied to the battery based on the first received mobile device status signal; and
    receiving a second mobile device status signal, wherein the adjusting of the flow of current from the AC adapter is further based on the second received mobile device status signal.

8. The method of claim 7, wherein the adjusting the level of the charging current further comprises:
    monitoring the battery; and
    generating a sense current.

9. The method of claim 7, wherein the adjusting the flow of current further comprises:
    determining a state of the mobile device based on the received first mobile device status signal and the received second mobile device status signal; and
    generating a state signal according to the determined state of the mobile device.

10. The method of claim 9, wherein the adjusting the flow of current further comprises:
    generating a reference current based on the generated state signal; and
    monitoring the battery and generating a sense current.

11. The method of claim 10, wherein the adjusting the flow of current further comprises:
    comparing the generated reference current and the generated sense current; and
    generating a comparison signal based on the comparison of the generated reference current and the generated sense current.

12. The method of claim 11, wherein the adjusting the flow of current further comprises:
    controlling the flow of current of the AC adapter to the battery based on the generated comparison signal.

13. The method of claim 7, further comprising:
    determining whether the system is busy based on a first mobile device status signal and a second mobile device status signal;
    responsive to determining that the system is busy, setting a reference current to a low level, wherein the low level is low relative to a high level; and
    responsive to the reference current being set a low level, setting the charging current to the low level.

14. The method of claim 7, further comprising:
    determining whether the system is in standby mode based on a first system signal and a second system signal;
    responsive to determining that the system is in standby mode, setting a reference current to a high level, wherein the high level is high relative to a low level; and
    responsive to reference current being set at a high level, setting the charging current at the high level.

15. A mobile device comprising:
    a mobile device chipset configured to generate a first mobile device status signal and a second mobile device status signal; and
    a battery charging circuit configured to receive the generated first mobile device status signal and the second mobile device status signal, the battery charging circuit further comprising:
        a monitoring circuit configured to monitor a battery and generate a sense current;
        a comparing circuit configured to compare a reference current and the generated sense current, wherein the comparing circuit is further configured to generate a comparison signal;
        a control circuit configured to control a level of a charging current applied to the battery based on the comparison signal; and
    a state determining circuit configured to receive the generated first mobile device status signal and the generated second mobile device status signal from the mobile device chipset, and wherein the state determining circuit is further configured to generate a status signal.

16. The mobile device of claim 15, wherein the battery charging circuit further comprises:
    a reference current generating circuit configured to generate the reference current based on the generated status signal.

17. The mobile device of claim 15, wherein the charging current is received from an AC adapter coupled to the mobile device.

* * * * *